United States Patent [19]
Nagashima

[11] Patent Number: 6,065,214
[45] Date of Patent: May 23, 2000

[54] PORTABLE TRIMMER

[75] Inventor: Akira Nagashima, Kawasaki, Japan

[73] Assignee: Kioritz Corporation, Tokyo, Japan

[21] Appl. No.: 09/209,477

[22] Filed: Dec. 11, 1998

[30] Foreign Application Priority Data

Dec. 12, 1997 [JP] Japan ................................. 9-343250

[51] Int. Cl.[7] ............................................. A01D 34/67
[52] U.S. Cl. ............................ 30/276; 30/347; 56/12.7
[58] Field of Search ................................. 330/276, 347; 56/12.5, 12.7, 295

[56] References Cited

U.S. PATENT DOCUMENTS

| | | |
|---|---|---|
| 4,006,528 | 2/1977 | Katsuya . |
| 4,794,695 | 1/1989 | Hurst ........................................ 30/276 |
| 5,174,027 | 12/1992 | Gusthalin ................................. 30/276 |
| 5,293,691 | 3/1994 | Sugihara et al. ......................... 30/276 |
| 5,774,993 | 7/1998 | Schlessmann ............................ 30/276 |
| 5,906,051 | 5/1999 | Nannen .................................... 30/276 |

*Primary Examiner*—Douglas D. Watts
*Attorney, Agent, or Firm*—Jacobson, Price, Holman & Stern, PLLC

[57] ABSTRACT

A braking device of a portable trimmer according the present invention comprises a cylindrical brake drum portion provided around a cutter blade retainer, an anti-rotation device, and a brake shoe provided inwardly of the brake drum portion and supported by a support shaft. The brake shoe extends along an inner surface of the brake drum portion so that the distance between the support shaft and the line tangent to the middle portion of the brake shoe exceeds the radius of the inner wall surface of the brake drum portion. An anti-rotation device is installed in a vacant space within a gear case and inwardly of the brake drum portion.

4 Claims, 5 Drawing Sheets

PORTABLE TRIMMER

BACKGROUND OF THE INVENTION

The present invention relates to a portable trimmer for cutting weeds or grass and in particular, to a portable trimmer employing a braking device for preventing a rotary cutter from rotating before a cutting operation is started, and a anti-rotation device for locking a rotatable shaft supporting the rotary cutter in a fixed position during replacing or installing the rotary cutter.

DESCRIPTION OF THE PRIOR ART

Portable trimmers for cutting weeds by use of a rotary cutter are well known in the art. Such a rotary cutters of portable trimmers are driven by a two-stroke cycle air-cooled compact internal combustion engine, which idles at a low speed when the trimmer is not being used for cutting weeds or the like. It is also known to provide a braking device to prevent free rotation of the rotary cutter when the engine idles at a low speed to assure the operator's safety. The rotary cutter is usually mounted on and fastened by a nut to a threaded rotatable shaft driven by the internal combustion engine. It is also known to provide an anti-rotation device to prevent the rotatable shaft on which the rotary cutter is mounted from rotating to enable detaching or attaching of the fastening means for permitting the rotary cutter to be removed or installed.

Thus, it is desirable that the portable trimmer be provided with the braking device and the anti-rotation device, but at the same time, the portable trimmer must be as compact and lightweight as possible to reduce working load exerted on the operator during use of the trimmer.

Therefore, the object of the present invention is to provide a portable trimmer having a braking device and an anti-rotation device which can be installed in a conventional portable trimmer without requiring an increase in the outer dimensions of the trimmer.

SUMMARY OF THE INVENTION

The object of the present invention is accomplished by a preferred embodiment portable trimmer, which includes a supporting tube and a cutting device mounted on the supporting tube at a front end thereof with a rotary cutter mounted thereon. A braking device prevents the rotary cutter from rotating and an anti-rotation device prevents the rotary cutter from rotating during removal or installation of the rotary cutter. The cutting device has a case fixed to the supporting tube at the front end thereof with a rotatable shaft being positioned within the case. A circular plate-like cutter retainer which rotates with the rotatable shaft and the rotary cutter which is detachably mounted on the rotatable shaft. A fastener is threadably engaged with a threaded portion circumferentially formed at an end portion of the rotatable shaft and for attaching the rotary cutter to the cutter retainer. The braking device has a brake drum provided around the cutter retainer, a pivotally supporting shaft within the brake drum and a brake shoe supported by the pivotally supporting shaft within the brake drum portion for selective engagement with the brake drum. An anti-rotation device is provided in a vacant space between opposite ends of the brake shoe as seen in a plan view.

The braking device of the portable trimmer of the present invention functions so that when the engine of the portable trimmer is not yet started or is running at a low idle speed, a brake lining is pushed against an inner surface of the brake drum portion to prevent the cutter retainer, the rotatable shaft and the rotary cutter from rotating.

Further, since the brake shoe is provided only on one side within the brake drum, a vacant space remains inside the brake drum. The anti-rotation device is installed therein. As a result, the braking device and the anti-rotation device are accommodated in a limited structural space within the conventional portable trimmer. Therefore, the entire size of the portable trimmer can be kept the same as a conventional one without increasing its outer dimensions.

In another aspect of the present invention, the braking device further comprises biasing means which engages one end of the brake shoe so as to press the brake shoe against an inner wall surface of the brake drum portion. A cam is mounted adjacent the other end of the brake shoe so that the cam engages the brake shoe and moves it between a braking position and a releasing position. A pulling wire is attached to the cam for controlling the cam.

In another embodiment of the present invention, cavities are formed in a plate surface of the cutter retainer, and the anti-rotation device comprises a rod member which aligns with the cavities and is movable between a protruded position which prevents rotation and a retracted position which permit rotation, and biasing means for biasing the rod member toward the retracted position.

DETAILED DESCRIPTION OF THE PREFERRED EMBODIMENTS

Referring to the attached drawings, the preferred embodiment of the present invention shall be described, with it being understood that the same numerical designators are employed for the same components in the different figures.

Figure 1:
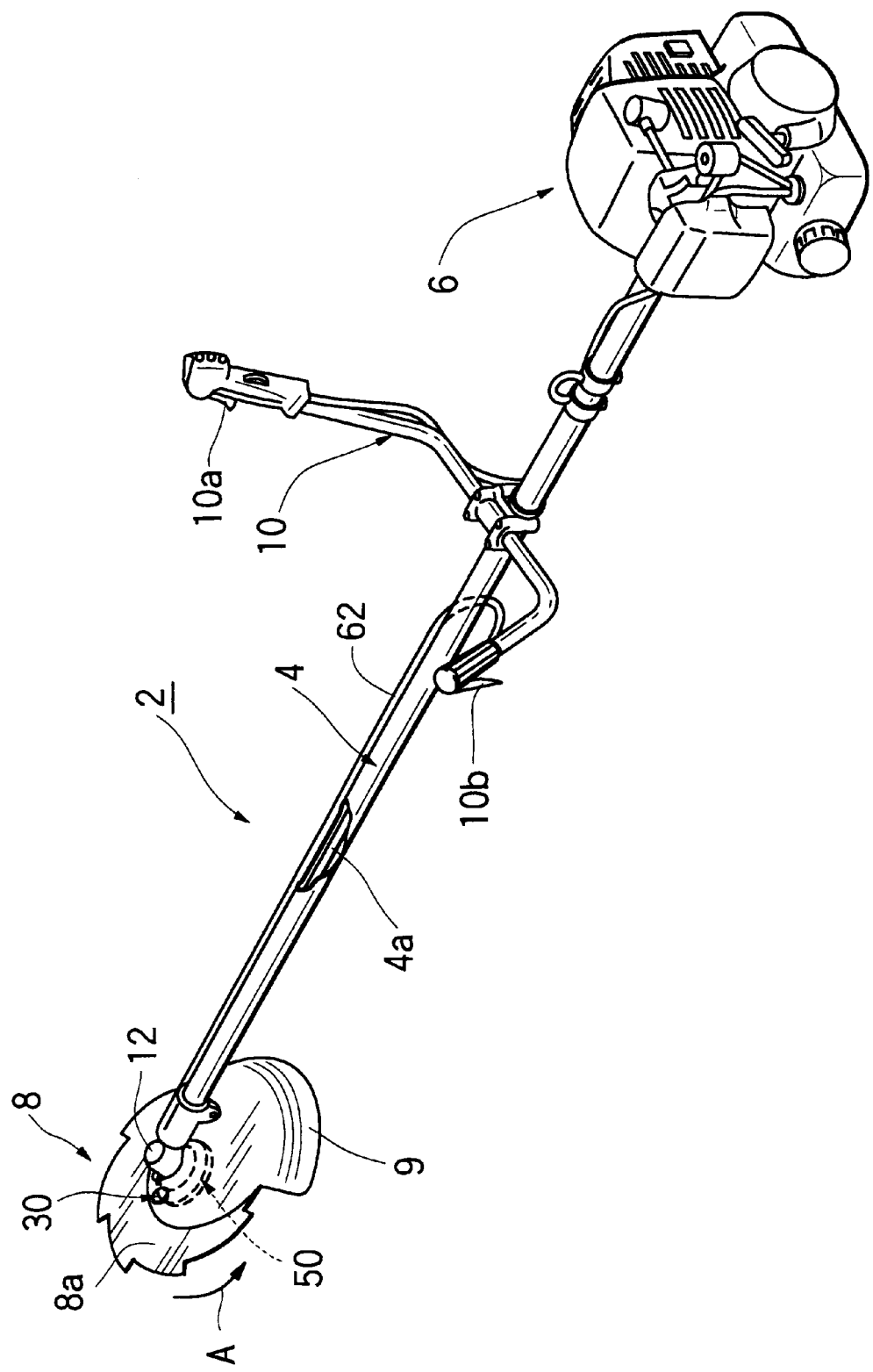
FIG. 1 is an overall perspective view of a portable trimmer according to the preferred embodiment.

As shown in FIG. 1, a portable trimmer 2 essentially comprises an engine or a two-stroke cycle air-cooled compact internal combustion engine 6, a supporting tube 4, a power transmitting shaft 4a inserted in the supporting tube 4 and extends straight in a forward direction from the engine 6 via a centrifugal clutch (not illustrated), and a cutter assembly 8 mounted on the supporting tube 4 at a front end thereof and a rotary cutter blade 8a provided the cutter assembly 8. The portable trimmer 2 has a safety cover 9 for preventing cut grass and small stones from being scattered by the rotary cutter blade 8a toward an operator. Further, the supporting tube 4 has a handle portion 10 to be held by the operator at a middle portion thereof. The handle portion 10 has a throttle lever 10a and a brake release lever 10b.

Figure 2:
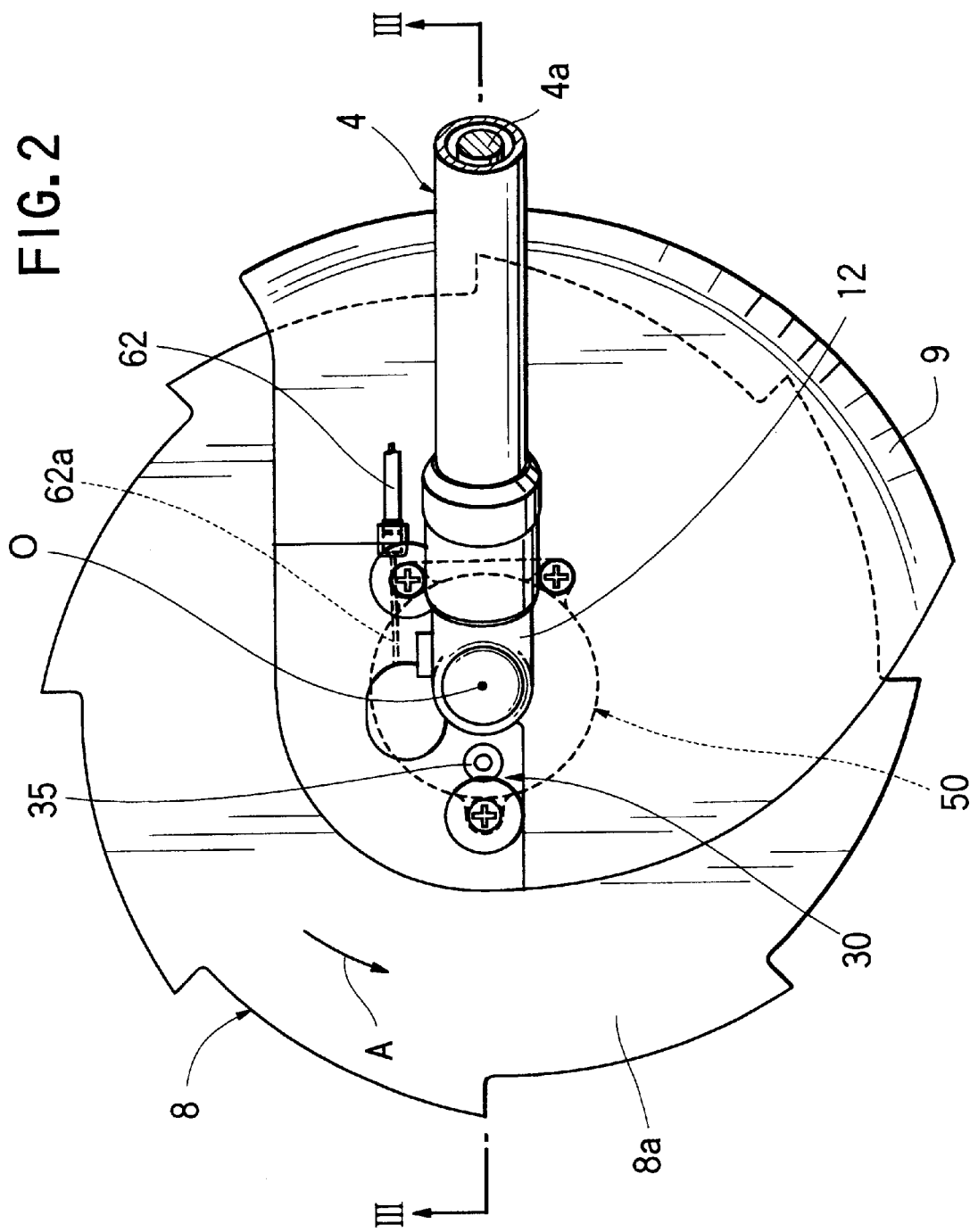
FIG. 2 is a plan view of a cutting device of the portable trimmer according to the preferred embodiment.
Figure 3:
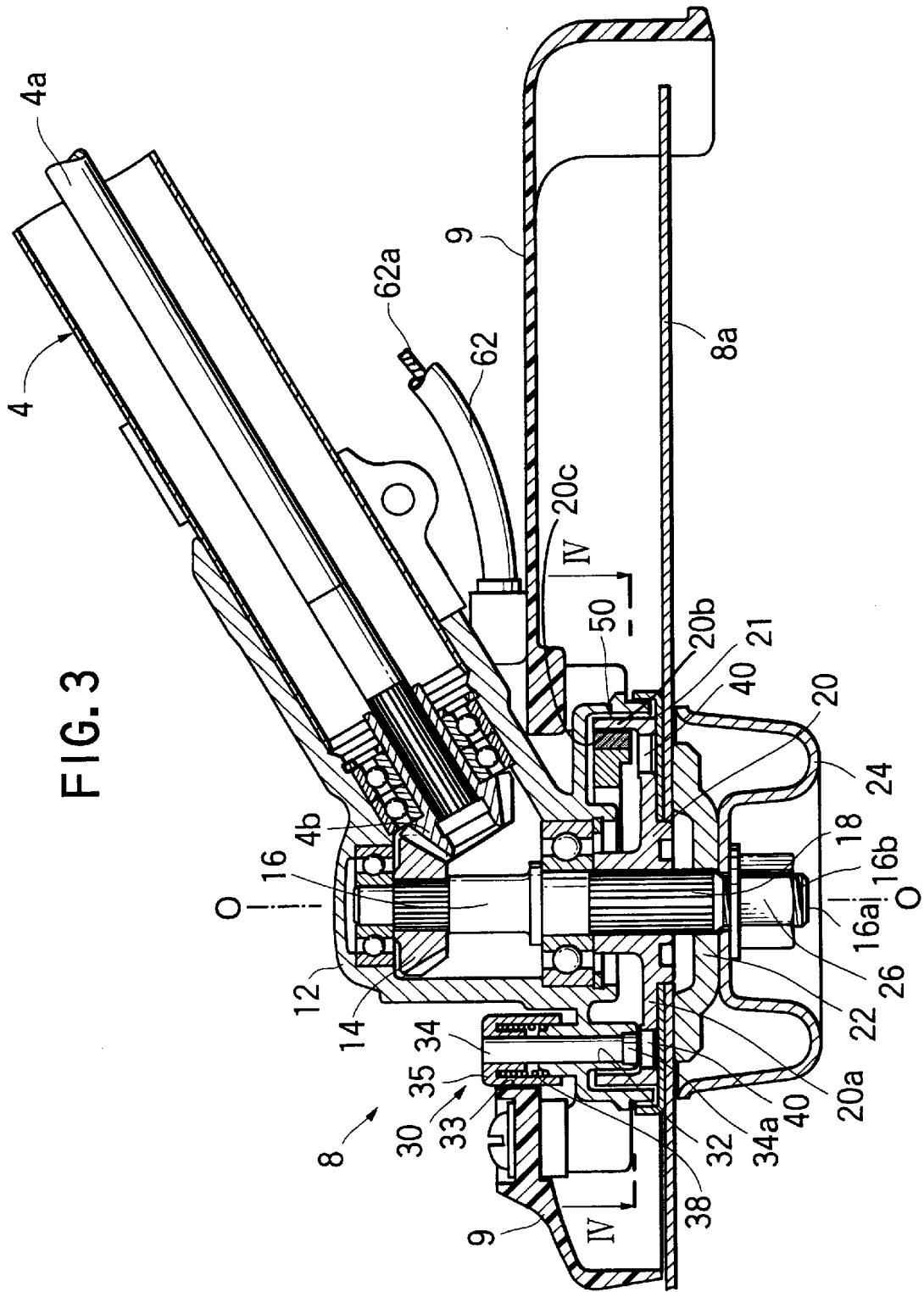
FIG. 3 is a sectional view taken along a line III—III of FIG. 2.

Referring now to FIGS. 2 and 3, the structure of the cutter assembly 8 shall be described in detail. The cutter assembly 8 includes a gear case 12 fixed to the supporting tube 4 at its front end thereof, a driven bevel gear 14 provided inside the gear case 12 so as to engage with a driving gear 4b attached to the power transmitting shaft 4a, and a rotatable cutter support shaft 16 extending vertically downward from the gear case 12 toward the ground and driven via the driving gear 4b and the driven bevel gear 14. A spline portion 18 is formed in the lower middle portion of the rotatable shaft 16. The rotatable shaft 16 is provided with, in order from top to bottom, a cutter blade retainer 20 fitted over the spline portion 18 so as to integrally rotate with the rotatable shaft 16, a cover plate 21, the rotary cutter blade 8a, a cutter blade holding fitting 22 to hold the rotary cutter blade 8a against the cutter blade retainer 20, and a protective cover 24 for preventing the lower end 16a of the rotatable cutter support shaft 16 from touching the ground. Further, these components are integrally fastened to the rotatable cutter support shaft 16 by a self-lock nut 26 which engages with a male threaded portion 16b formed at a lower portion of the rotatable cutter support shaft 16.

The gear case 12 is provided with an anti-rotation device 30 which acts to lock the cutter blade retainer 20 and the rotary cutter blade 8a and the rotatable cutter support shaft 16 against rotation. Such locking is effected to aid in tightening or loosening of the self-lock nut 26 in order to attach or detach the rotary cutter blade 8a for the purpose of replacing and sharpening. A first through hole 32 and a second through hole 33 respectively extend vertically through the gear case 12 and the safety cover 9. A rod member 34 extends through the holes 32 and 33. The rod member 34 is slidably mounted within the first through hole 32 and the second through hole 33 for movement between a retracted position in which the rod member 34 (see FIG. 3) is positioned completely within the gear case 12 and a protruded position (not illustrated) in which the lower end of the rod member 34 projects downwardly from and below the gear case 12. An enlarged head member 35 is provided on the upper end of the rod member 34 and the enlarged head member 35 has an outer diameter large enough to cover the second through hole 33 so as to prevent cut grass or deposit of dust from sticking around the rod member 34. Further, a compression spring 38 or second pressing means is provided to bias the rod member 34 toward the retracted position.

As seen from FIG. 3, the cutter blade retainer 20 has a plurality of engaging cavities 40 which are arranged along a circle having a center at an axis line O—O of the cutter retainer 20 shown in FIG. 3, each of which cavities 40 has an axis which extends parallel to the axis line of the rod member 34. When the rod member 34 is positioned in its protruded position, the lower end 34a of the rod member 34 projects into a cavity 40 with which the rod 34 is aligned.

Figure 4:
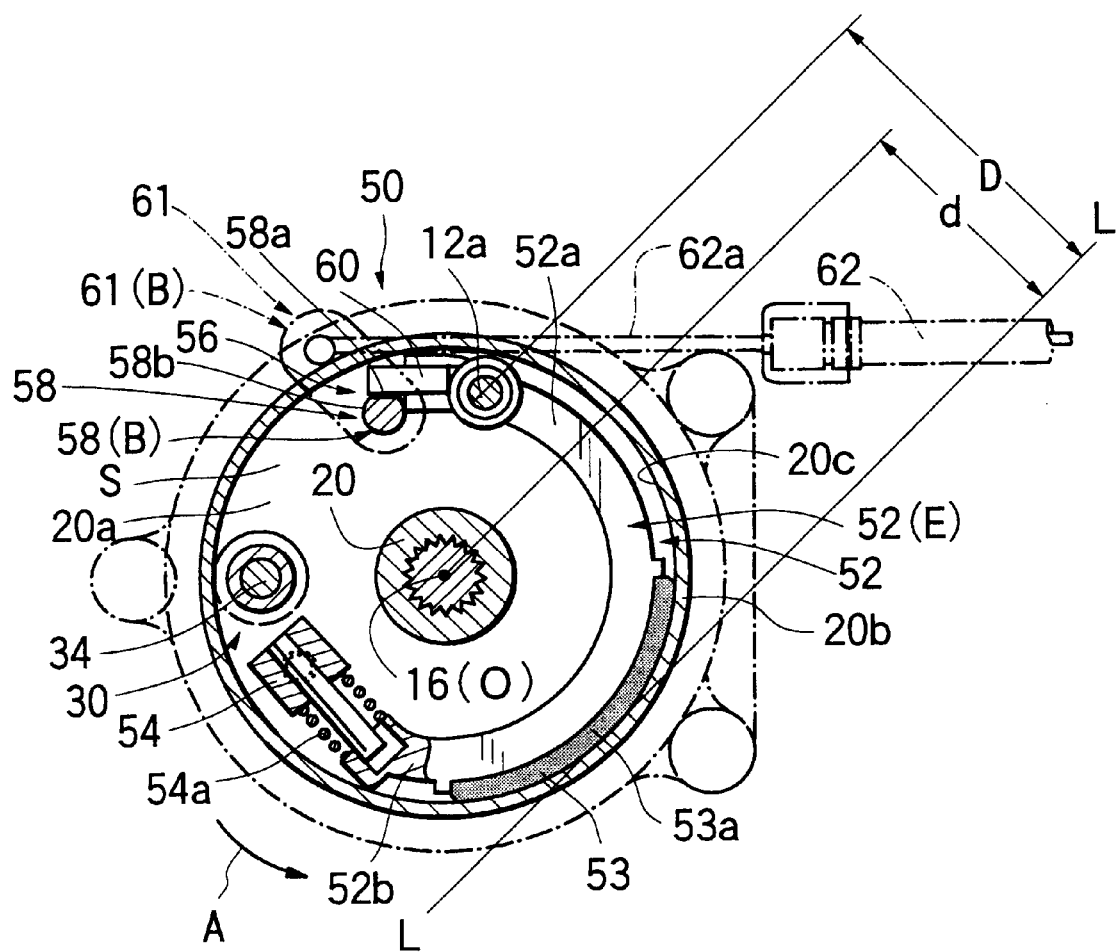
FIG. 4 is a sectional view taken along a line IV—IV of FIG. 3 illustrating the details of a braking device and an anti-rotation device according to the preferred embodiment and shows a braking position of a braking device.

Further, as shown in detail in FIG. 4, the portable trimmer 2 is provided with a braking assembly 50 for preventing the rotary cutter 8a from rotating when the portable trimmer 2 is not being operated or the engine 6 is running at its low idle speed. The cutter blade retainer 20 comprises a round plate portion 20a attached to the rotatable cutter support shaft 16 so as to rotate therewith and a brake drum portion 20b which is provided around the round plate portion 20a and which extends upwardly in parallel with the axis line O—O of the rotatable shaft 16. The braking assembly 50 is an internally expanding type brake and comprises a brake shoe 52 which is provided inside the brake drum portion 20b and is curved along the brake drum portion 20b, and a brake lining 53 which is adhesively attached to the brake shoe 52 and is capable of being biased against the inner wall surface 20c of the brake drum portion 20b.

The brake shoe 52 is pivotably attached to the gear case 12 by a support shaft 12a at one end 52a thereof. The other end 52b of the brake shoe 52 makes contact with a compression spring 54a which is provided to the gear case 12 between a fixedly positioned stop member 54 and the other end 52b so as to bias the brake shoe 52 toward the brake drum portion 20b and thereby urge the brake lining 53 against the inner wall surface 20c of the brake drum portion 20b. The rotary cutter blade 8a and the brake drum portion 20b rotate together in a direction indicated by an arrow "A" shown in FIGS. 1, 2 and 4 during grass cutting operation. The support shaft 12a is disposed on the leading position with respect to the rotational direction indicated by the arrow "A" while the stop member 54 and compression spring 54a are disposed on the trailing side. This arrangement brings a servo effect, i.e., the brake shoe 52 is biased more strongly against the inner wall 20c of the brake drum portion 20b when the brake drum portion 20b rotates together with the rotary cutter 8a in the direction of the arrow "A".

The brake shoe 52 extends along the inner wall surface 20c of the brake drum portion 20b so that the distance "D (FIG. 4)" between the support shaft 12a and the line L—L tangent to the middle portion 53a of the brake lining 53 adhesively mounted on the brake shoe 52 exceeds the radius "d" of the inner wall surface 20c of the brake drum portion 20b. This geometry enables the compression spring 54a to press the brake lining 53 against the inner wall surface 20c of the brake drum portion 20b by a strong brake force. When the brake lining 53 of the brake shoe 52 is at a braking position "E" where it is biased against the inner wall surface 20c of the brake drum portion 20b, the cutter retainer 20, the rotatable shaft 16, and the rotary cutter 8a is prevented from rotating, and thus the rotary cutter 8a is prevented from rotating when the engine 6 of the portable trimmer 2 is not started or is running at a slow idle speed.

A cam mechanism 56 or cam means for activating or releasing the braking assembly 50 is provided to the brake shoe 52 at the one end 52a thereof on the opposite side of the main portion of the brake shoe 52 with respect to the support shaft 12a. As seen from FIG. 4, the cam mechanism 56 comprises a partially cylindrical cam member 58 which is rotatably supported, and a cam contacting member 60 which is mounted on the brake shoe 52 at the one end 52a thereof which makes contact with the circumferential wall of the cam member 58 which defines a cam profile. The cam member 58 is constantly biased toward the rotational position "B" shown in FIG. 4 by the biasing force exerted by the first pressing means 54 and an appropriate return spring (not illustrated) mounted on the brake release lever 10b which is arranged on the handle portion 10. The cam profile comprises a flat plane 58a formed by cutting away some of a circumferential portion of the cam member 58 and a cylindrical surface 58b adjacent to the flat plane 58a. The cam member 58 has an arm member 61 provided to rotate therewith and the arm member 61 is connected with a wire member 62a or a pulling wire of a Bowden cable 62 arranged along the supporting tube 4 so as to be able to unlock the braking assembly 50 by operation of the brake release lever 10b.

As described above, the brake shoe 52 is arranged only on one side of the brake drum portion 20b and the anti-rotation device 30 is disposed in a vacant space "S" externally of the brake shoe 52 and inside the brake drum portion 20b, as shown in FIG. 4.

Figure 5:
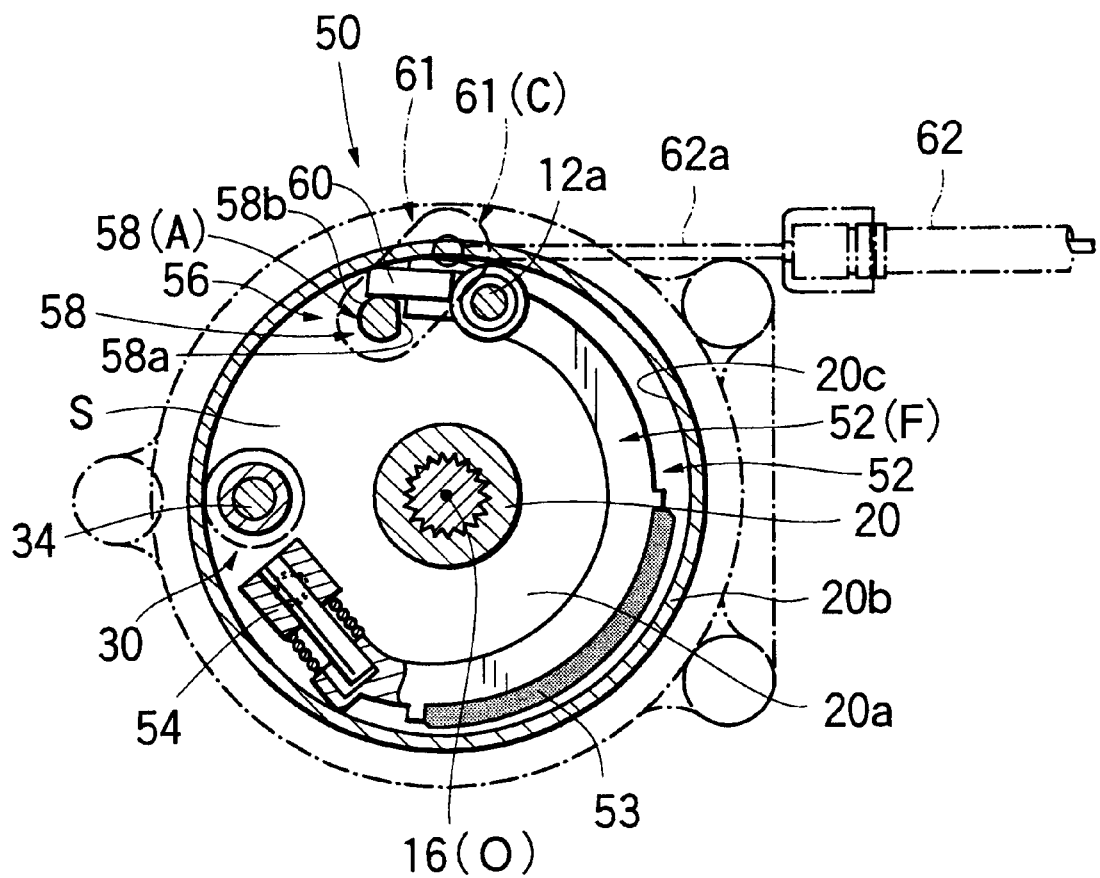
FIG. 5 shows a released non-braking position of the braking device.

Referring to FIGS. 4 and 5, it shall be described how the braking assembly 50 of the portable trimmer 2 according to the present embodiment is operated. Before the starting of the portable trimmer engine 6 or during the idling of the engine 6, the brake shoe 52 is at a braking position 52(E) as shown in FIG. 4 as a result of being biased toward the brake drum portion 20b by the compression spring 54a a counterclockwise direction about the support shaft 12a so that the brake lining 53 is urged against the inner wall surface 20c of the brake drum potion 20b. The cam contacting member 60 makes contact with the flat plane 58a of the cam member 58. When the operator starts the engine 6 and holds the throttle lever 10a and the brake release lever 10b on the handle portion 10, a throttle valve (not illustrated) is opened and the wire member 62a connected to the brake release lever 10b is pulled so that the arm member 61 is rotated in a clockwise direction from the rotational position 61 (B) shown in FIG. 4 to the rotational position 61 (C) shown in FIG. 5. During this rotation, the cam contacting member 60 comes to contact with the cylindrical surface 58b and thereby being pivoted in a clockwise direction about support shaft 12a. The brake shoe 52 consequently rotates in a clockwise direction about the support shaft 12a against the force of the compression spring 54a and the brake lining 53 moves away from contact with the inner wall surface 20c of the brake drum portion 20b. Therefore, the cutter retainer 20 becomes free to rotate and so does the rotatable shaft 16, and the rotary cutter blade 8a starts rotating when the centrifugal clutch is engaged as a consequence of the increased rotational speed (rpm) of the rotatable shaft 16 so that the operator can initiate the trimming operation.

When the operator releases the brake release lever 10b after finishing his/her trimming operation, the tension force applied to the wire member 62a is released and the cam member 58 returns from the rotational position 58(A) shown in FIG. 5 to the rotational position 58(B) shown in FIG. 4. Accordingly, the plane surface 58a of the cam member 58 comes to contact with the cam contacting member 60 which is then rotated counterclockwise about the support shaft 12a. The brake shoe 52 is consequently rotated counterclockwise about the support shaft 12a by the pressing force from the compression spring 54a and the brake lining 53 is urged against the inner wall surface 20c of the brake drum portion 20b. Accordingly, the rotation of the cutter retainer 20, the rotation of the rotatable shaft 16 is prevented so that the rotary cutter blade 8a is prevented from rotating.

Referring to FIG. 3, the function of the anti-rotation device 30 according to the preferred embodiment shall be described.

To detach the rotary cutter blade 8a from the portable trimmer 2 constituted as above, first, the operator stops the engine 6 and places the portable trimmer 2 on the ground with the cutter assembly 8 turned upside down, i.e., with the nut 26 facing upwardly. Then, while the operator pushes the enlarged head member 35 provided to the upper end of the rod member 34 toward the rotary cutter blade 8a, he/she manually turns the rotary cutter blade 8a so that the rod member 34 aligns with one engaging cavity 40 formed in the cutter retainer 20 to allow the rod member 34 to move into said engaging cavity 40 to the protruded rod position.

Then, while keeping the rod member 34 in the protruded position, the operator turns the self-lock nut 26 in the direction to loosen (in the clockwise direction in the embodiment as illustrated) by a proper tool such as a wrench. During this operation, since the rod member 34 prevents the cutter retainer 20 from rotating, the rotatable cutter support shaft 16, and the rotary cutter blade 8a are prevented from rotating so that the self-clock nut 26 can be easily removed. After removing the self-clock nut 26, the protection cover 24 and the cutter blade holding fitting 22 are detached from the rotatable cutter support shaft 16 and then, the rotary cutter blade 8a is detached. When the operator releases the enlarged head member 35 after having loosened the nut 26, the rod member 34 automatically returns from the protruded position to the retracted position due to the return force exerted by the second compression spring 38.

The new or sharpened rotary cutter blade 8a can be attached to the rotatable cutter support shaft 16 by carrying out the detaching process in a reverse order. That is, the portable trimmer 2 is placed on the ground in a upside-down position as in the detaching process. Then, the rotary cutter blade 8a, the cutter holding fitting 22, and the protective cover 24 are attached in this sequence to the rotatable cutter support shaft 16. Then, the self-clock nut 26 is manually rotated in the fastening direction (in the counterclockwise direction in the embodiment as illustrated) until the self-clock nut 26 is lightly (finger tight) pressed against the protective cover 24. Then, the operator pushes the enlarged head member 35 with his/her finger and turns the rotary cutter blade 8a so that the rod member 34 aligns with one of the engaging cavities 40 formed in the cutter retainer 20, and moves the rod member 34 into the engaging cavity 40 from the retracted position to the protruded position to lock the rotary cutter blade 8a etc. against further rotation. Then, the self-lock nut 26 is strongly tightened with a tool such as a wrench while the rod member 34 is kept pushed toward the protruded locking position. When the operator moves his hand off the enlarged head member 35 after having tightened the nut 26, the rod member 34 automatically returns from the protruded locking position to the retracted non-locking position due to the return force exerted by the second compression spring 38.

According to the preferred embodiment, the braking device 50 has the brake shoe 52 curved along the brake drum portion 20b on one side within the brake drum portion 20b and whereby a vacant space "S" is formed between the one end 52a and the other end 52b of the brake shoe 52 inside the brake drum portion 20b, and the anti-rotation device 30 can be installed in the vacant space "S". The provision of the space "S" enables the installation of the braking device 50 and the anti-rotation device 30 within a limited structural space of a conventional portable trimmer and without increasing the outer dimension of the trimmer and the conventional dimension and weight can be maintained.

Further, the present embodiment can provide a lighter device 50 because the brake shoe 52 is installed only on one side of the brake drum portion 20b.

Further, in the brake shoe 52 of the present embodiment, since the support shaft 12 is arranged in the leading position with respect to rotational direction "A" of the brake drum portion 20b and on the other hand, the first pressing means 54, 54a is in the trailing position, a servo effect can be obtained, i.e., the brake shoe 52 can be strongly biased against the inner wall 20c of the brake drum portion 20b when the brake drum portion 20b rotates in the direction of the arrow "A".

Further, in the present embodiment, the brake shoe 52 extends along the inner wall surface 20c of the brake drum portion 20b so that the distance "D" between the support shaft 12a and the line L—L tangent to the middle portion 53a of the brake lining 53 adhesively mounted on the brake shoe 52 exceeds the radius "d" of the inner wall surface 20c of the brake drum portion 20b. This geometry enables obtainment of a stronger brake force because the first pressing means 54, 54a biases the brake lining 53 against the inner wall surface 20c of the brake drum portion 20b with the greater pressing force.

Further, in the present embodiment, since the braking device 50 is controlled by the cam mechanism 56, operation of the braking device 50 can be effected by the brake release lever 10b by lightweight means.

The present invention has thus been shown and described with reference to specific embodiments. However, it should be noted that the present invention is in no way limited to the details of the described arrangements but changes and modifications may be made without departing from the scope of the appended claims.

For example, in the illustrated embodiment, the brake release lever 10b is separately provided for two reasons, i.e., to make sure that the portable trimmer 2 does not operate unless the handle portion 10 is properly held by both hands and to simplify the structure for reliable activation. However, the braking device 50 may be interlocked with the throttle lever 10a so as to be activated when the throttle lever 10a is released.

In the brake shoe 52, the distance "D" between the support shaft 12a and the line L—L tangent to the middle portion 53a of the brake lining 53 adhesively mounted on the brake shoe 52 is preferably greater than the radius "d" of the inner wall surface 20c of the brake drum portion 20b. However, the distance "D" can be less than the radius "d" as far as the space "S" which allows the anti-rotation device 30 to be installed within the brake drum portion 20b.

What is claimed is:

1. A portable trimmer, comprising:

a supporting tube;

a cutter assembly mounted on said supporting tube at a front end thereof and having a rotary cutter blade mounted thereon;

a braking assembly for preventing said rotary cutter from rotating;

an anti-rotation device for preventing said rotary cutter from rotating during removal or installation of said rotary cutter;

said cutter assembly having a gear case fixed to said supporting tube at said front end thereof, a rotatable cutter support shaft accommodated within said gear case, a circular plate-like cutter blade retainer which rotates with said rotatable cutter support shaft, said rotary cutter blade being detachably mounted on said rotatable shaft, and a fastener which threadably engages with a threaded portion circumferentially formed at an end portion of said rotatable cutter support shaft for attaching said rotary cutter blade to said cutter blade retainer;

said rotatable cutter blade retainer including a cylindrical brake drum portion, said braking assembly including a support shaft positioned internally of said cylindrical brake drum portion and a brake shoe having a first end and a second end and being pivotally supported at said first end by said support shaft in location inwardly of said cylindrical brake drum portion; and;

said ant-rotation device being provided in a vacant space within the confines of the cylindrical brake drum portion.

2. A portable trimmer in accordance with claim 1, wherein said braking device further comprises biasing means engaging said second end of said brake shoe so as to press said brake shoe against an inner wall surface of said brake drum portion, a cam mounted for rotation and engaging said first end of said brake shoe so that said brake shoe moves between a braking position and a releasing position in response to rotation of said cam between said first position and said second position and a pulling wire connected to said cam means for rotating said cam means between said first position and said second position.

3. A portable trimmer in accordance with claim 1, additionally including cavities formed in said cutter blade retainer, and said anti-rotation device comprises a rod member alignable with said cavities and is movable between a protruded rotation preventing position and a retracted rotation permitting position, and biasing means for urging said rod member toward said retracted position.

4. A portable trimmer in accordance with claim 2, additionally including cavities are formed in said cutter retainer, and said anti-rotation device comprises a rod member which alignable with said cavities and is movable between a protruded rotation preventing position and a retracted rotation permitting position, and biasing means for urging said rod member toward said retracted position.

* * * * *